(12) United States Patent
Love et al.

(10) Patent No.: US 6,827,660 B2
(45) Date of Patent: Dec. 7, 2004

(54) ENDLESS POWER TRANSMISSION BELT

(75) Inventors: Lance Love, Springfield, MO (US); Jack D. White, Jr., Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 452 days.

(21) Appl. No.: 09/765,121

(22) Filed: Jan. 17, 2001

(65) Prior Publication Data

US 2002/0094897 A1 Jul. 18, 2002

(51) Int. Cl.$^7$ .................................................. F16G 1/10
(52) U.S. Cl. ...................................................... 474/262
(58) Field of Search ................................. 474/201, 202, 474/265, 244, 247, 237, 238, 266, 267

(56) References Cited

U.S. PATENT DOCUMENTS

| | | | |
|---|---|---|---|
| 3,478,613 A | 11/1969 | Waugh et al. ................. 74/233 |
| 3,853,017 A | * 12/1974 | White et al. ................. 474/238 |
| 3,863,515 A | 2/1975 | Meadows ..................... 74/231 |
| 4,022,070 A | 5/1977 | Wolfe ........................... 74/231 |
| 4,139,406 A | 2/1979 | Richmond et al. ........... 156/140 |
| 4,617,075 A | 10/1986 | Wetzel et al. ............... 156/137 |
| 6,066,188 A | * 5/2000 | Benedict et al. ............. 51/293 |
| 6,228,448 B1 | * 5/2001 | Ndebi et al. ............... 428/35.2 |

* cited by examiner

Primary Examiner—David A. Bucci
Assistant Examiner—Vicky A. Johnson
(74) Attorney, Agent, or Firm—Joseph V. Tassone; Reuben Wolk

(57) ABSTRACT

This invention provides an improved power transmission belt which has a relatively thick rubber backing layer for improved interface with associated pulleys and improved wear resistance. The belt also has an aramid, glass, or other high modulus relatively inextensible cord secured by a layer of fabric.

11 Claims, 2 Drawing Sheets

FIG-4

ENDLESS POWER TRANSMISSION BELT

BACKGROUND OF THE INVENTION

1. Field of the Invention

This invention relates to an endless power transmission belt, also known as a V-belt. Such belts are widely used for automotive or industrial purposes and primarily comprised of an outer compression section, an inner tension section, and a load-carrying section disposed between the compression and tension sections. The load-carrying section utilizes longitudinally extending load-carrying cords imbedded in a cushion of polymeric material. For special purposes, such belts may also include other layers of material. Such belts may have a simple trapezoidal cross-section, or may be of the multi-rib type comprising a plurality of laterally speed trapezoidal sections formed in the compression section.

2. Prior Art Statement

The load-carrying cords utilized in the belts have evolved through the years from natural materials to rayon, nylon, or similar synthetic materials, to materials having a high modulus, such as aramid. These later materials are needed to create belts which are stronger, more stretch resistant, provide longer running times without losing their properties. Unfortunately, the elevated temperatures required to cure such belts cause significant expansion of the curing molds and the cords will tend to float in a random pattern unless some control is provided. This has been done in the past by forming a barrier of fabric or lateral cords (also known as tire cords). It has been found that the use of a single composite layer of fabric with a heavy rubber coating as a barrier results in an excessive splice thickness which will damage the cord when the belt is flexed. Typical of prior art constructions are shown in Waugh U.S. Pat. No. 3,478,613; Meadows U.S. Pat. No. 3,863,515; and Wolfe U.S. Pat. No. 4,022,070.

SUMMARY OF THE INVENTION

In order to control the location of the aramid load-carrying cords, it has been found that this can be accomplished by providing a fabric layer on the tension section outwardly of the load-carrying section. A second, discreet, rubber backing layer is disposed outwardly of the fabric layer to provide a pulley engaging surface. Despite the fact that this adds to the thickness of the cross-section of the belt, it succeeds in its purpose of preventing abrasion between the outer surface of the belt and the pulley. The result of the improvement is a belt having a greater belt life and a reduction in backside pulley wear, particularly in dusty environments such as in agricultural machinery. In addition, the backside coefficient of friction is greater than if fabric backing layers were to be used, and thus becomes important where the outer surface of the belt, which is the backing layer, engages a back side idler pulley in certain power transmission systems. The backing layer works in conjunction with an additional fabric layer, preferably rubber-impregnated, which is disposed between the backing layer and the load-carrying cords. A further advantage of this construction is the reduction in thickness of the splice, hereinafter sometimes referred to as splice thickness or simply splice, which is required in the fabric layer. In most constructions, the splice forces the strength cord to be misaligned in an axial direction, which is obviously undesirable. The combination of the fabric layer and the backing layer reduces the splice thickness to avoid the misalignment. The novel design is particularly useful in multiple rib belts, of the type shown in U.S. Pat. No. 4,139,406, issued to Richmond et al. It should be noted that backing layers having been used in other belt structures, such as designated by reference number 15 in U.S. Pat. No. 4,617,075 issued to Wetzel, et al., such layers were not intended for the purposes outlined above, but were used in the process for forming a toothed "timing" belt. This patent also shows a layer 15A which is not fabric, but only a fiber reinforced rubber layer. Thus, the present structural arrangement creates unexpected results for creating a useful product.

DESCRIPTION OF PREFERRED EMBODIMENTS

Figure 1:
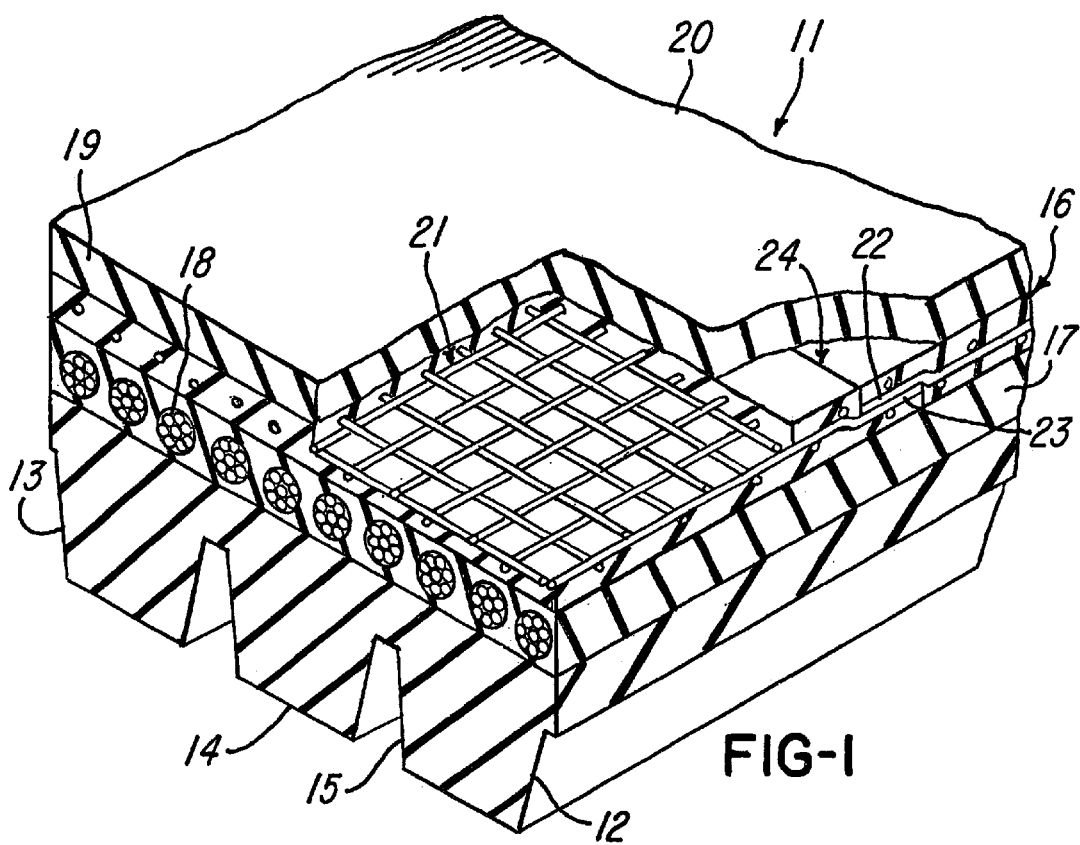
FIG. 1 is a perspective view with parts in cross-section, parts in elevation, and parts broken away illustrating one exemplary embodiment of the belt body of the invention.

As shown in FIG. 1, the endless power transmission belt 11 is shown as a portion of an entire continuous belt adapted to be operated between driving and driven pulleys in an endless manner well known in the art. The belt has a compression section 12, defined by a plurality of longitudinally extending ribs 13, each having a trapezoidal cross-section (also referred to as truncated vee ribs) extending partially into the compression section, having inner surfaces 14 and angled side surfaces 15. The compression section is composed of a rubber material well-known in the art. A tension section 16, composed of a similar material, is disposed outwardly of the compression section. A load-carrying section 17 is disposed between the compression and tension sections, and is composed of a rubber material well-known in the art. This section also comprises a plurality of longitudinally extending cords or cord windings 18 made of high modulus material, the preferred material being aramid. These cords are imbedded in the section 17 and are utilized as load-carrying cords, and as indicated above, they are stretch-resistant and provide additional improved belt characteristics.

In order to prevent the cords from floating during construction, a backing layer and a fabric layer are formed as part of the belt. The backing layer 19 is disposed outwardly of the tension section and also forms the outer surface 20 of the belt. This surface 20 also has the additional function of acting as a wear surface against a back side idler which is used in some belt drive systems, and provides a higher coefficient of friction than a fabric backing which is frequently used. The backing layer has a thickness ranging from 0.015 to 0.050 inch, and is composed of a special polymeric material such as EPDM (ethylene propylene diene monomer). The fabric layer 21 is disposed in the tension section, preferably adjacent the backing layer and the load-carrying cords, and has been found to work in conjunction with the backing layer to provide the above-mentioned control of the cords. As shown, the backing layer is adjacent the fabric layer, although it may be spaced therefrom. The fabric layer 21 is comparatively thin, ranging from about 0.005 to 0.035 inch. As shown in FIG. 1, the fabric layer is formed of a rubber impregnated square woven fabric having threads made of materials well-known in the art, such as cotton, rayon, nylon, aramid, polyester or fiberglass. The fabric layer is preferable formed of a wide strip of material wrapped around the load-carrying section, and having transversely extending ends 22 and 23 which are overlapped to form a splice 24. The present construction permits the splice to be thinner than in conventional constructions. As shown in FIG. 1, this avoids misalignment of the strength cords 18.

Modifications

Figure 2:
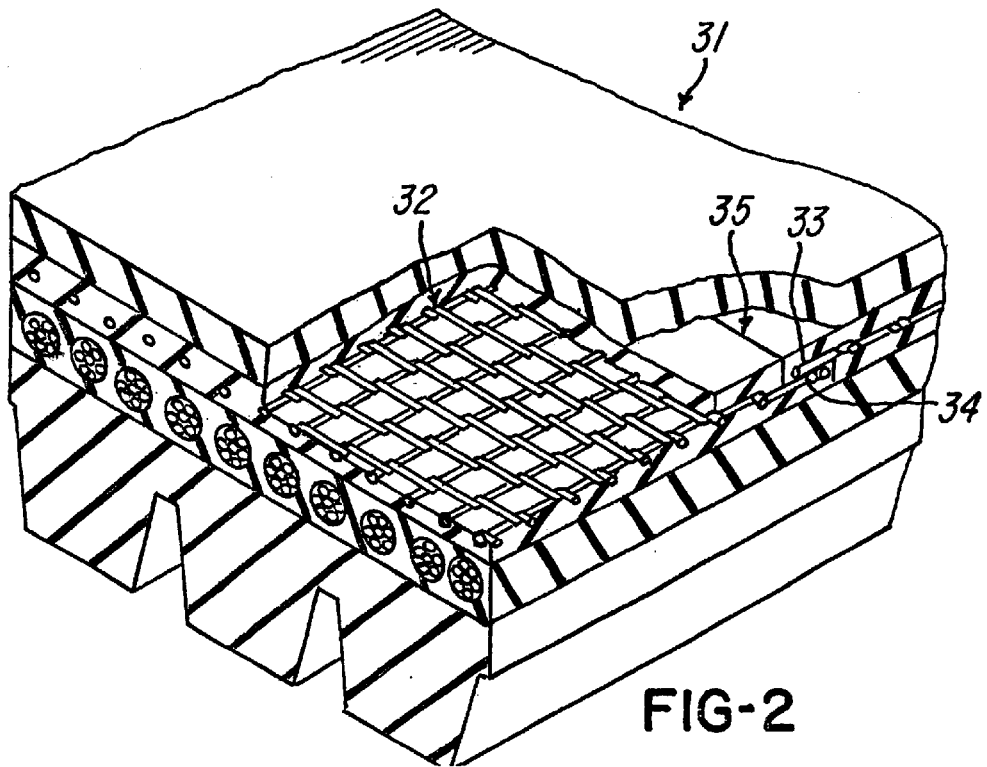
FIGS. 2–4 are partial views, similar to FIG. 1, illustrating various types of alternative fabric arrangements.

As alternative forms of the invention, it is contemplated to use other types of fabric instead of the square woven material of layer 21. FIG. 2 illustrates a belt 31 having a construction similar to belt 11, except that fabric layer 32 is formed of a knitted material similar to that shown in the Richmond patent. As in FIG. 1, the fabric layer is formed with ends 33 and 34 which have a splice 35 similar to splice 24.

Figure 3:
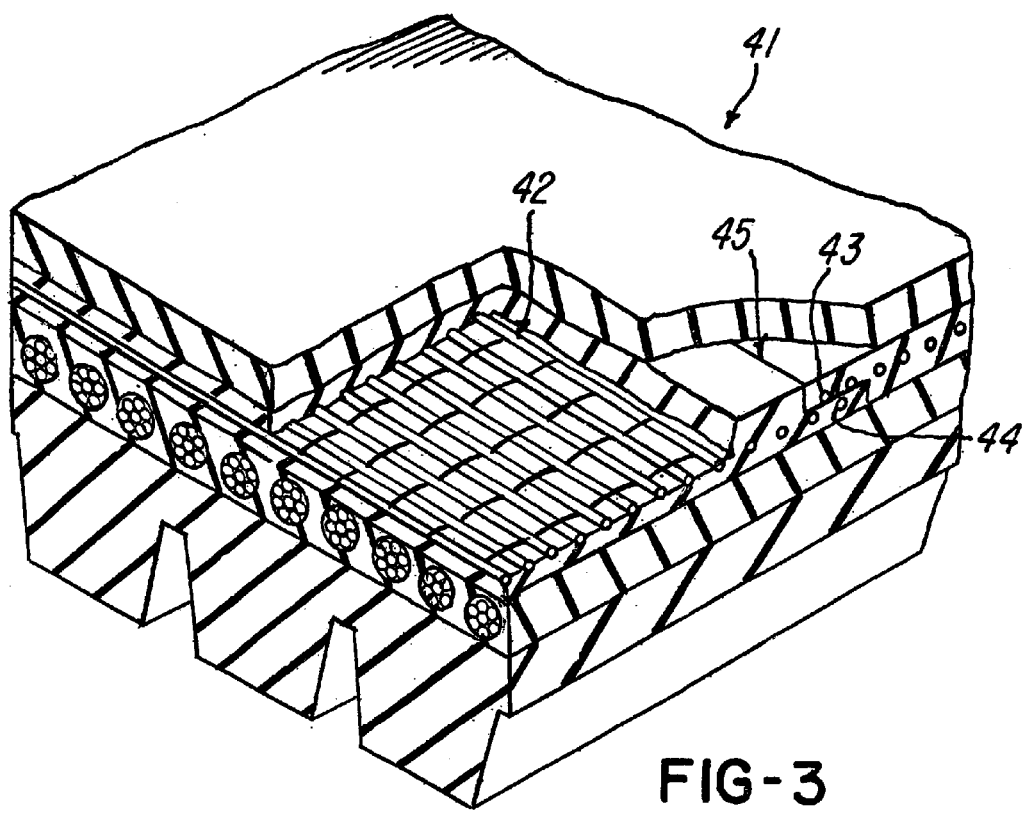

FIG. 3 illustrates belt 41 similar to belts 11 and 31, except that the fabric layer 42 is formed of a structure known as "tire cord", consisting of transversely extending strength cords and weak tie strands which hold the strength cords in a substantially parallel relationship. This type of cord is also shown in the Richmond patent. The fabric layer is also formed with ends 43 and 44 overlapped to form splice 45 similar to the splices 24 and 35.

Figure 4:
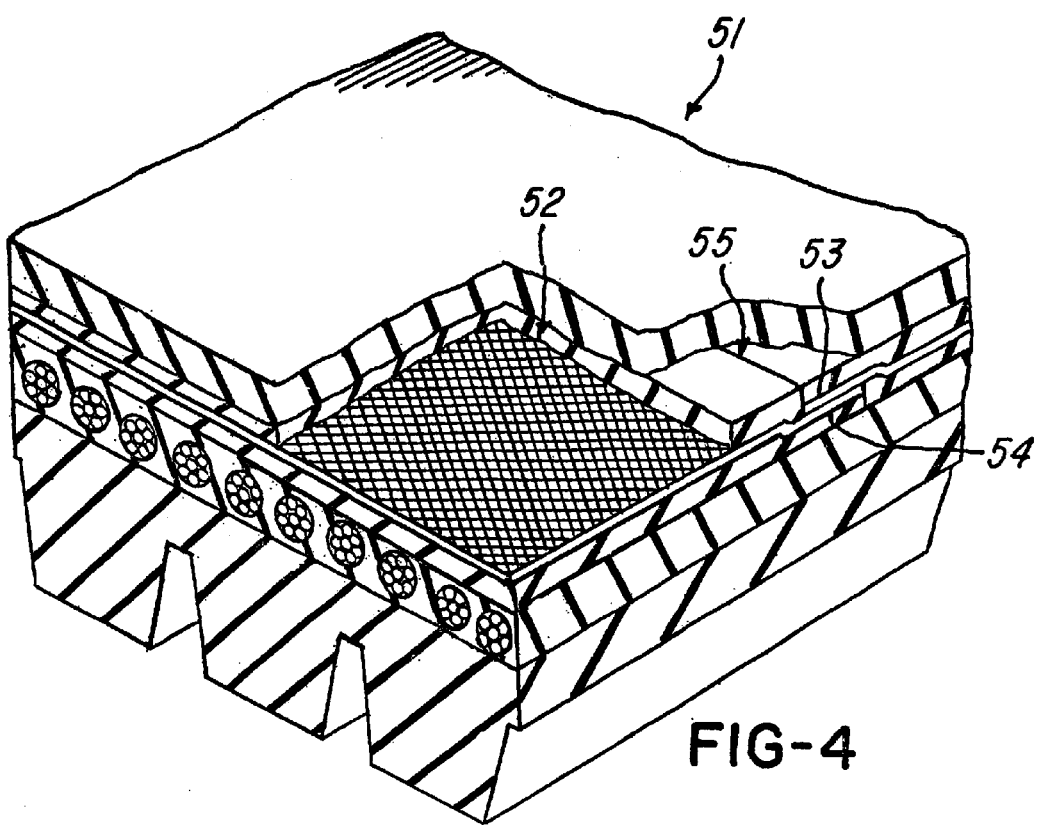

FIG. 4 illustrates a belt 51 similar in construction to the other belts, except that fabric layer 52 is formed of a bias laid woven fabric referred to as "stress-relieved", in which the warp and weft threads are disposed at an angle of 95° to 155° to each other. Such a fabric is shown in the above-referenced Waugh patent. The fabric layer is also formed as a sheet having ends 53 and 54 which are overlapped to form splice 55, similar to the other splices.

Reference has been made throughout this application to splice thickness. What is meant by splice thickness is the total thickness of the spliced structure at the location of the splice.

The invention described herein comprises a belt structure and method in which the "fabric layer" and the "backing layer" comprise separate and distinct layers, and further are installed in the belt discreetly during the building process. This is distinct from a structure and method in which the "backing layer" is laminated to the "fabric layer" in a separate operation and the resulting composite is then applied to the belt during the building process. This is the primary distinction which ensures that the splice thickness can be minimized—the splice in the "backing layer" can be staggered some distance away from the splice in the "fabric layer", in which case, the maximum splice thickness will be limited to twice the fabric thickness or twice the backing thickness (whichever is thicker), rather than twice the combined thickness of a composite containing both elements.

(This maximum in either case is reached with a plain lap splice; a butt splice or bevel splice—with or without sewing—would have a thickness substantially equal to the structure spliced, whether "backing", "fabric", or "composite". A skived lap splice, in which the rubber "backing" is removed from the ends to be overlapped in the splice, would have a maximum thickness equal to two fabric layers.).

Other modifications are also contemplated. For example, instead of the trapezoidal or truncated vee ribs, fully V-shaped ribs may be utilized, as shown for example in FIG. 5 of the above-referenced Richmond patent. Other modifications are also contemplated as being within the scope of the inventive concept.

What is claimed is:

1. In an endless power transmission belt comprising an inner compression section, an outer tension section, and a load-carrying section disposed between said compression and tension sections and having longitudinally extending load-carrying cords; the improvement wherein said load-carrying cords are made of a high modulus material and said belt further comprises a polymeric backing layer disposed outwardly of said tension section and forms the outer surface of said belt, and a fabric layer disposed between said backing layer and said load-carrying cords.

2. The belt of claim 1 wherein said load-carrying cords are composed of aramid.

3. The belt of claim 1 wherein said belt is comprised of a plurality of longitudinally extending ribs in said compression section.

4. The belt of claim 3 wherein said ribs have a trapezoidal cross-section.

5. The belt of claim 1 wherein said backing layer has a thickness between 0.015 and 0.050 inch.

6. The belt of claim 1 wherein said backing layer is composed of ethylene propylene diene monomer.

7. The belt of claim 1 wherein said backing layer is adjacent said fabric layer.

8. The belt of claim 1 wherein said fabric layer comprises a rubber impregnated fabric.

9. The belt of claim 8 wherein said fabric is selected from a group consisting of knitted, square woven, tire cord, or stress-relieved fabrics.

10. The belt of claim 1 wherein said fabric layer has a thickness between 0.005 and 0.035 inch.

11. The belt of claim 1 wherein said fabric layer comprises transversely extending ends joined together by a splice, said splice having a maximum thickness of 0.070 inch.

* * * * *